(12) United States Patent
Su

(10) Patent No.: US 12,138,958 B2
(45) Date of Patent: Nov. 12, 2024

(54) HUB STRUCTURE AND HUB FOR A BICYCLE

(71) Applicant: GIANT MANUFACTURING CO., LTD., Taichung (TW)

(72) Inventor: Hui-Yuan Su, Taichung (TW)

(73) Assignee: GIANT MANUFACTURING CO., LTD., Taichung (TW)

(*) Notice: Subject to any disclaimer, the term of this patent is extended or adjusted under 35 U.S.C. 154(b) by 394 days.

(21) Appl. No.: 17/645,457

(22) Filed: Dec. 22, 2021

(65) Prior Publication Data

US 2022/0227170 A1 Jul. 21, 2022

(51) Int. Cl.
*B60B 27/02* (2006.01)
*B60B 27/04* (2006.01)
*F16D 41/36* (2006.01)

(52) U.S. Cl.
CPC .......... *B60B 27/023* (2013.01); *B60B 27/047* (2013.01); *F16D 41/36* (2013.01)

(58) Field of Classification Search
CPC ............. B60B 27/023; B60B 2900/111; B60B 27/047; F16D 41/36; F16D 41/22; F16D 41/24
See application file for complete search history.

(56) References Cited

U.S. PATENT DOCUMENTS

| | | | |
|---|---|---|---|
| 6,588,564 B1 | 7/2003 | Jager et al. | |
| 7,087,128 B2 | 8/2006 | Spahr et al. | |
| 7,562,755 B2 | 7/2009 | Spahr | |
| 8,113,529 B2 | 2/2012 | Spahr et al. | |
| 8,696,213 B2 | 4/2014 | Spahr | |
| 8,936,144 B2 | 1/2015 | Spahr et al. | |
| 9,010,875 B2 | 4/2015 | Spahr et al. | |
| 9,212,708 B2 | 12/2015 | Spahr et al. | |
| 9,370,968 B2 | 6/2016 | Spahr et al. | |
| 9,604,495 B2 | 3/2017 | Spahr et al. | |
| 10,065,452 B2 | 9/2018 | Walthert et al. | |
| 10,286,726 B2 | 5/2019 | Spahr et al. | |
| 10,442,245 B2 | 10/2019 | Walthert et al. | |
| 10,549,575 B2 | 2/2020 | Spahr et al. | |
| 10,549,578 B2 | 2/2020 | Walthert et al. | |
| 10,625,540 B2 | 4/2020 | Walthert et al. | |
| 10,668,768 B2 | 6/2020 | Spahr et al. | |
| 10,882,355 B2 | 1/2021 | Walthert et al. | |
| 10,933,691 B2 | 3/2021 | Walthert et al. | |
| 10,995,806 B2 | 5/2021 | Walthert et al. | |

(Continued)

FOREIGN PATENT DOCUMENTS

CN 210191013 U 3/2020
DE 19914991 A1 10/2000

(Continued)

*Primary Examiner* — Richard M Lorence
*Assistant Examiner* — Aimee Tran Nguyen
(74) *Attorney, Agent, or Firm* — Finnegan, Henderson, Farabow, Garrett & Dunner, L.L.P.

(57) ABSTRACT

A hub structure includes a tubular body defining a hollow cavity. The tubular body includes a first surface and a second surface, the first surface defining a first groove extending along an axial direction of the tubular body. The first groove is defined by an inner sidewall surrounding the hollow cavity, an outer sidewall spaced from and configured to face the inner sidewall, and a bottom surface coupling the inner sidewall and the outer sidewall.

15 Claims, 19 Drawing Sheets

(56) References Cited

U.S. PATENT DOCUMENTS

| | | |
|---|---|---|
| 11,220,133 B2 | 1/2022 | Walthert et al. |
| 2013/0088075 A1 | 4/2013 | Spahr et al. |
| 2013/0105266 A1* | 5/2013 | Spahr .................. F16D 41/36 192/46 |
| 2017/0096029 A1* | 4/2017 | Fujita .................. F16D 1/10 |
| 2018/0050564 A1 | 2/2018 | Walthert et al. |
| 2019/0225014 A1 | 7/2019 | Walthert et al. |
| 2020/0009908 A1* | 1/2020 | Walthert .............. F16D 41/36 |
| 2020/0254813 A1 | 8/2020 | Spahr et al. |
| 2021/0023878 A1 | 1/2021 | Walthert et al. |

FOREIGN PATENT DOCUMENTS

| | | |
|---|---|---|
| DE | 102011013536 A1 | 9/2012 |
| DE | 102011110199 A1 | 2/2013 |
| DE | 102011111487 A1 | 2/2013 |
| DE | 102012016945 A1 | 3/2014 |
| DE | 102012016949 A1 | 5/2014 |
| DE | 102011015962 B4 | 5/2016 |
| DE | 102014117145 A1 | 5/2016 |
| DE | 102004004106 B4 | 11/2016 |
| DE | 102007030190 B4 | 12/2016 |
| DE | 102007063895 B3 | 12/2016 |
| DE | 102016107752 A1 | 10/2017 |
| DE | 102016107755 A1 | 10/2017 |
| DE | 102017116945 A1 | 2/2018 |
| DE | 102017116954 A1 | 2/2018 |
| DE | 102017116960 A1 | 2/2018 |
| DE | 102018101720 A1 | 7/2019 |
| DE | 102018101725 A1 | 7/2019 |
| DE | 202018103890 U1 | 10/2019 |
| DE | 102007026821 B4 | 9/2020 |
| DE | 102020126453 A1 | 4/2021 |
| DE | 102020103129 A1 | 8/2021 |
| EP | 1140526 B1 | 3/2003 |
| EP | 1121255 B1 | 4/2003 |
| EP | 1522421 A2 | 4/2005 |
| EP | 1559584 A2 | 8/2005 |
| EP | 2559569 A2 | 2/2013 |
| EP | 2848427 A1 | 3/2015 |
| EP | 2497652 B1 | 5/2015 |
| EP | 2703679 B1 | 7/2015 |
| EP | 2703680 B1 | 3/2016 |
| EP | 3023325 A1 | 5/2016 |
| EP | 3238950 A2 | 11/2017 |
| EP | 3238951 A2 | 11/2017 |
| EP | 3275692 B1 | 5/2019 |
| EP | 3275693 B1 | 5/2019 |
| EP | 3275694 B1 | 5/2019 |
| EP | 3517315 A1 | 7/2019 |
| EP | 3590815 A1 | 1/2020 |
| EP | 3862194 A1 | 8/2021 |
| JP | 4781535 B2 | 9/2011 |
| JP | 4897141 B2 | 3/2012 |
| TW | 201739635 A | 11/2017 |
| TW | 201739636 A | 11/2017 |
| TW | 201808676 A | 3/2018 |
| TW | 201936419 A | 9/2019 |
| WO | WO 2000021762 A1 | 4/2000 |
| WO | WO 2000034056 A1 | 6/2000 |
| WO | WO 2000034057 A1 | 6/2000 |

\* cited by examiner

HUB STRUCTURE AND HUB FOR A BICYCLE

TECHNICAL FIELD

The disclosure relates to bicycles, and more particularly, to bicycle hubs.

BACKGROUND

Cycling has always been popular for its various roles, including transportation, travel, leisure, exercise, sports, and competition. Cycling's popularity spans all demographics of users, and includes recreational riders, amateur riders, avid rides, professional riders, and athletes. In recent years, bike-sharing and related services have increased in popularity, with many cities and regions creating incentives, programs, and services organized to provide sustainable and healthy transportation for their citizens.

A conventional bicycle often includes a freewheel mechanism, such as a freehub, to allow a rider to stop pedaling while the bicycle is still in forward motion. However, components used in the freewheel mechanism may increase the weight of the hub. In the pursuit of improving cycling speed and efficiency, it would be desirable to reduce the total weight of the bicycle by developing a simplified, lightweight freewheel mechanism used in the hub.

SUMMARY OF THE PRESENT DISCLOSURE

Consistent with some embodiments, a hub structure for use in a freewheel mechanism of a bicycle hub is provided. The hub structure includes a tubular body defining a hollow cavity. The tubular body includes a first surface and a second surface. The first surface defines a first groove extending along an axial direction of the tubular body. The first groove is defined by an inner sidewall surrounding the hollow cavity, an outer sidewall spaced from and configured to face the inner sidewall, and a bottom surface coupling the inner sidewall and the outer sidewall.

Consistent with some embodiments, a hub for a bicycle is provided. The hub for the bicycle includes a hub structure, a positioning plate mounted on a hub base, and a spring attached between the positioning plate and the hub structure. The hub structure includes a tubular body defining a hollow cavity, the tubular body including a first surface and a second surface, the first surface defining a first groove extending along an axial direction of the tubular body. The first groove is defined by a first inner sidewall surrounding the hollow cavity, a first outer sidewall spaced from and configured to face the first inner sidewall, and a bottom surface coupling the first inner sidewall and the first outer sidewall.

Consistent with some embodiments, a hub structure is provided. The hub structure includes a tubular body, an inner ring, and an outer ring. The tubular body includes a first surface and a second surface and defines a hollow cavity. Axial engagement components are arranged on the second surface. The inner ring protrudes from the first surface of the tubular body along an axial direction of the tubular body and substantially surrounds the hollow cavity. The outer ring protrudes from the first surface of the tubular body along the axial direction of the tubular body and substantially surrounds the inner ring. A height of the inner ring may be substantially equal to or greater than a height of the outer ring.

It is to be understood that the foregoing general descriptions and the following detailed descriptions are exemplary and explanatory only, and are not restrictive of the disclosure, as claimed.

DETAILED DESCRIPTION OF THE DRAWINGS

Aspects of the present disclosure are best understood from the following detailed description when read with the accompanying figures. The accompanying drawings, which are incorporated in and constitute a part of this specification, illustrate several exemplary embodiments and, together with the corresponding descriptions, provide examples for explaining the disclosed embodiment consistent with the present disclosure and related principles. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
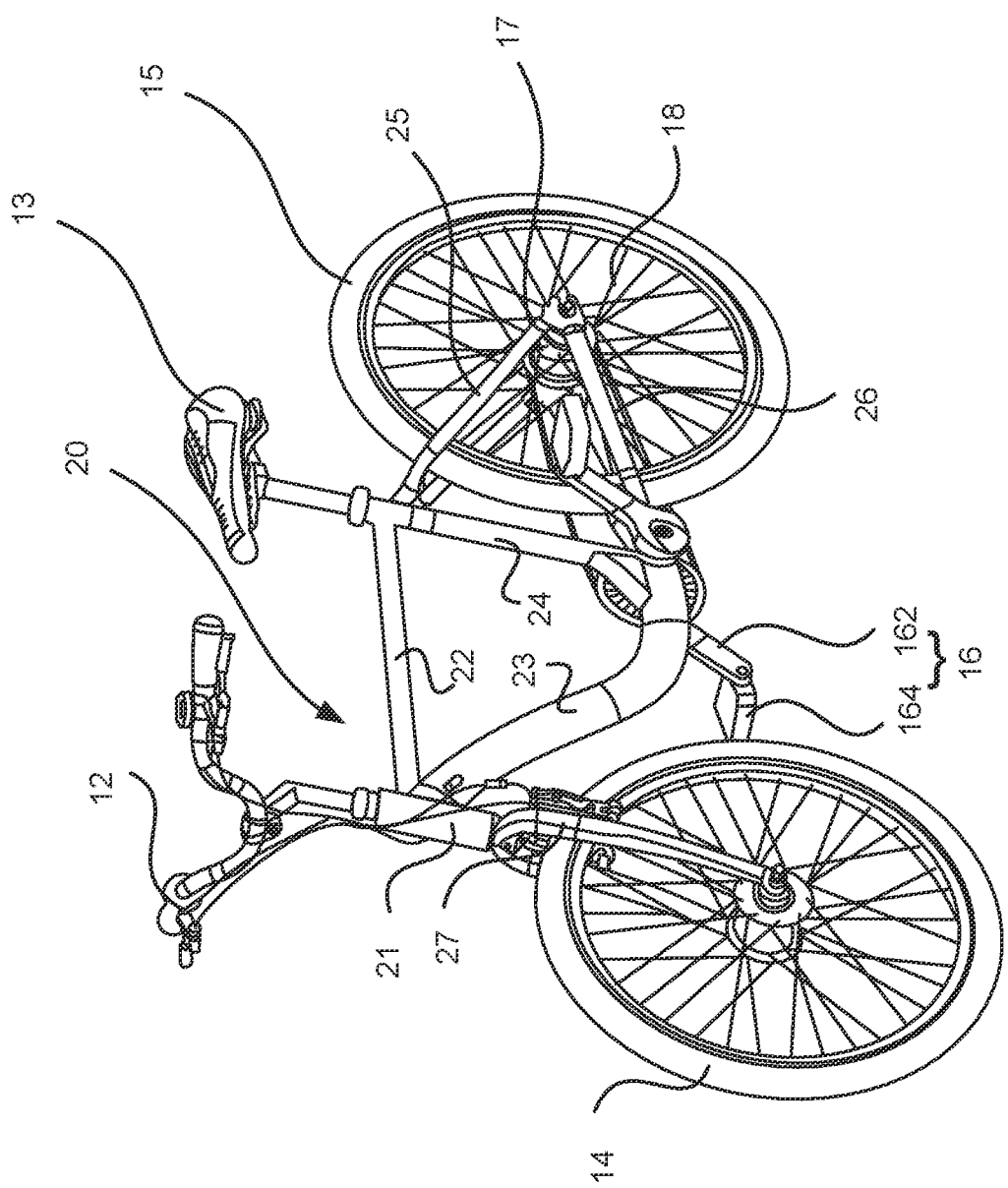
FIG. 1 is a perspective view illustrating a bicycle, according to an embodiment of the present disclosure.

Reference will now be made in detail to embodiments, examples of which are illustrated in the accompanying drawings and disclosed herein. The implementations set forth in the following description of embodiments are examples of systems and methods consistent with the aspects related to the disclosure and do not limit the scope of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view illustrating a bicycle 10, according to some embodiments of the present disclosure. As shown in FIG. 1, the bicycle 10 includes a frame 20. In some embodiments, the frame 20 may include a head tube portion 21, a top tube portion 22, a down tube portion 23, a seat tube portion 24, a pair of seat stays 25, a pair of chain stays 26, and a fork 27, but the present disclosure is not limited thereto. In various embodiments, the frame 20 of the bicycle 10 may have different designs.

The bicycle 10 also includes a handlebar 12 with one or more front brakes for stopping the bicycle 10, a seat 13, at least one front wheel 14, at least one rear wheel 15, a crank unit 16 including crank arm(s) 162 and pedal(s) 164, and a hub 17. As shown in FIG. 1, the handlebar 12 is coupled to the head tube portion 21 of frame 20. The seat 13 is coupled to the seat tube portion 24 of the frame 20. A wheel rim of the rear wheel 15 may define a rotation axis and may be configured to receive a tire. Hub 17 may be arranged to extend along the rotation axis rear wheel 15. Hub 17 may be radially spaced apart from the wheel rim of the rear wheel 15. Hub 17 can be, for example, a freehub. When a rider of bicycle 10 stops pedaling, hub 17 may freewheel, or turn freely, in the forward direction independently of the sprockets, so that pedals 164 do not turn with rear wheel 15. A plurality of spokes 18 may extend radially between hub 17 and the wheel rim of rear wheel 15. Spokes 18 interconnect hub 17 and a spoke-mounting wall on the wheel rim of rear wheel 15. In some embodiments, one or more covering units (not shown) can be mounted respectively on left and right sides of rear wheel 15 to confine a receiving space therebetween for receiving spokes 18.

When the user pedals, the pedaling drives crank unit 16 operationally connected to a driving member, such as a chain, via one or more variable diameter chain gears. Accordingly, the rotation of the driving member communicates a driving force to hub 17 associated with rear wheel 15. The operation of the pedals 164 can thereby drive rear wheel 15 and propel bicycle 10 forward.

A pair of seat stays 25 and a pair of chain stays 26 can be constructed to support rear wheel 15 at one end. Similarly, fork 27 may include a pair of fork blades or fork legs extending from generally opposite ends of a fork crown, and may be constructed to support front wheel 14 at one end. Accordingly, the rider can control handlebar 12 to communicate to fork 27 to facilitate rotation of front wheel 14 relative to frame 20 along a longitudinal axis of bicycle 10.

It is noted that the construction of bicycle 10 depicted in FIG. 1 is merely an example and is not meant to limit the present disclosure. The present disclosure is applicable to various bicycle configurations, including various street or road bike configurations, or other bicycles with more aggressive suspension systems commonly found in off-road or mountain bike frame configurations, and/or hybrids, cross-over or multi-purpose bicycle frame configurations.

Figure 2:
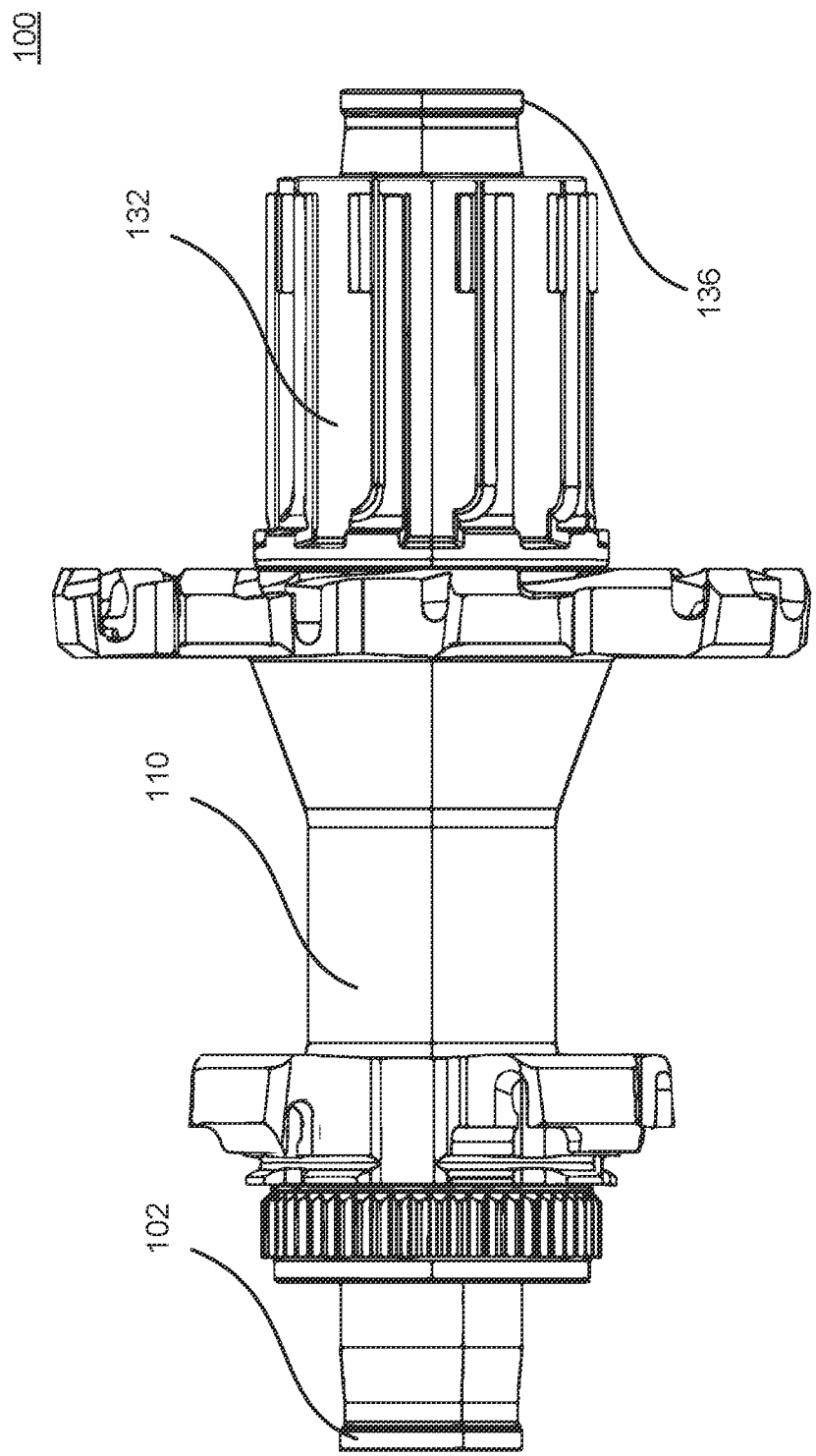
FIG. 2 is a side view of a hub for the bicycle shown in FIG. 1, according to an embodiment of the present disclosure.
Figure 3:
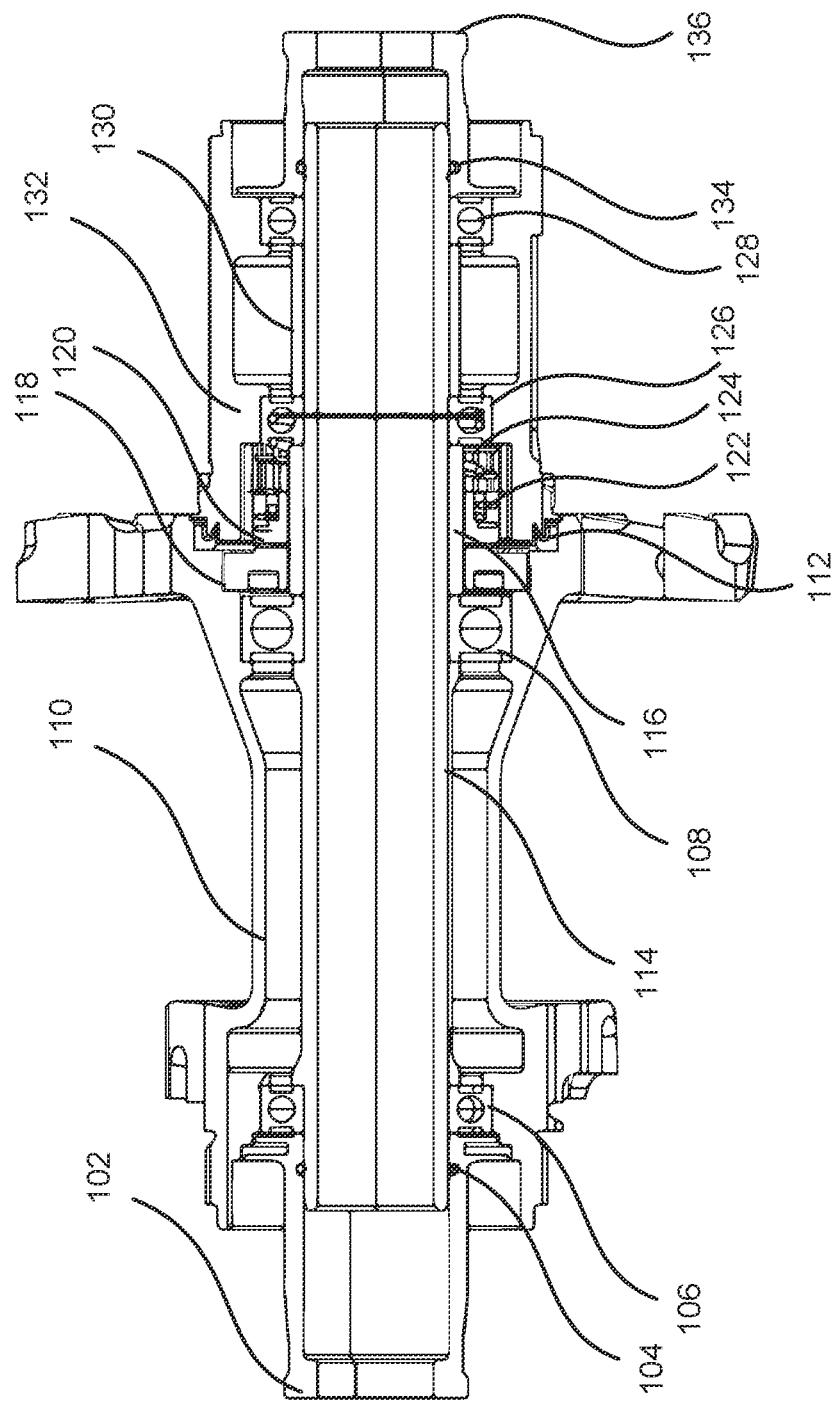
FIG. 3 is a cross-sectional view of the hub of FIG. 2, according to an embodiment of the present disclosure.

FIG. 2 and FIG. 3 are respective side and cross-sectional views of a hub 100 for the bicycle 10 shown in FIG. 1, according to some embodiments of the present disclosure. As previously described above in FIG. 1, in some embodiments, hub 100 may be mounted in the center of a bicycle wheel (e.g., rear wheel 15 of FIG. 1) and attached to spokes (e.g., spokes 18 of FIG. 1), which connect to the rim of the bicycle wheel. As shown in FIG. 2, hub 100 may include a hub body 110 rotatably mounted on a hub axle (not shown in FIG. 2) and connected to a rotor housing 132, and a hub-side cover 102 and a rotor-side cover 136 mounted onto the hub axle. Bearings and other components are arranged within the hub body 110 and the rotor housing 132. As shown in FIG. 3, in some embodiments, inside the hub body 110 and the rotor housing 132, hub 100 may include hub axle 114, a sealing device (e.g., an oil seal) 104 mounted between the hub-side cover 102 and the hub axle 114 to provide a tight seal, bearing units 106, 108, 126, and 128, a sealing device 112, a sleeve body 116 disposed between bearing units 108 and 126, a hub-side toothed disc unit 118, a rotor-side toothed disc unit 120, a spring 122, a positioning plate 124, a sleeve body 130 disposed between the bearing units 126 and 128, a sealing device (e.g., an oil seal) 134 mounted between the rotor-side cover 136 and the hub axle 114 to provide a tight seal. Hub axle 114 is configured to attach a wheel to a bicycle and provides support for bearings on which the wheel rotates.

As shown in FIG. 2 and FIG. 3, hub-side cover 102 and the rotor-side cover 136 are mounted onto the respective two ends of hub axle 114. Sealing device 112 is configured to seal between hub body 110 and rotor housing 132, and other internal components, such as the bearing units and the freewheel system inside the hub 100. In some embodiments, hub axle 114 may be made of fiber reinforced plastic to reduce the weight of hub 100.

Figure 4:
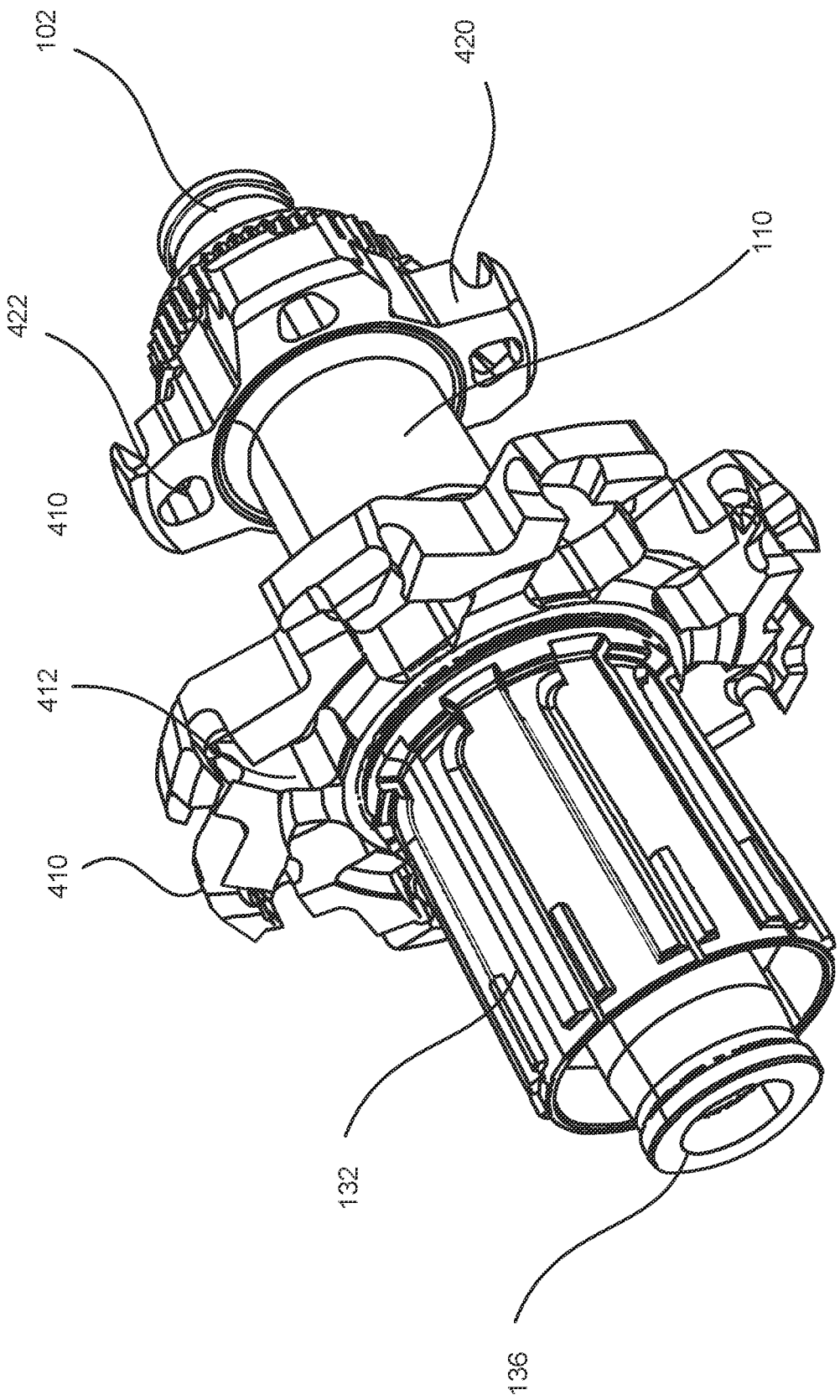
FIG. 4 is a perspective view of the hub of FIG. 2, according to an embodiment of the present disclosure.
Figure 5:
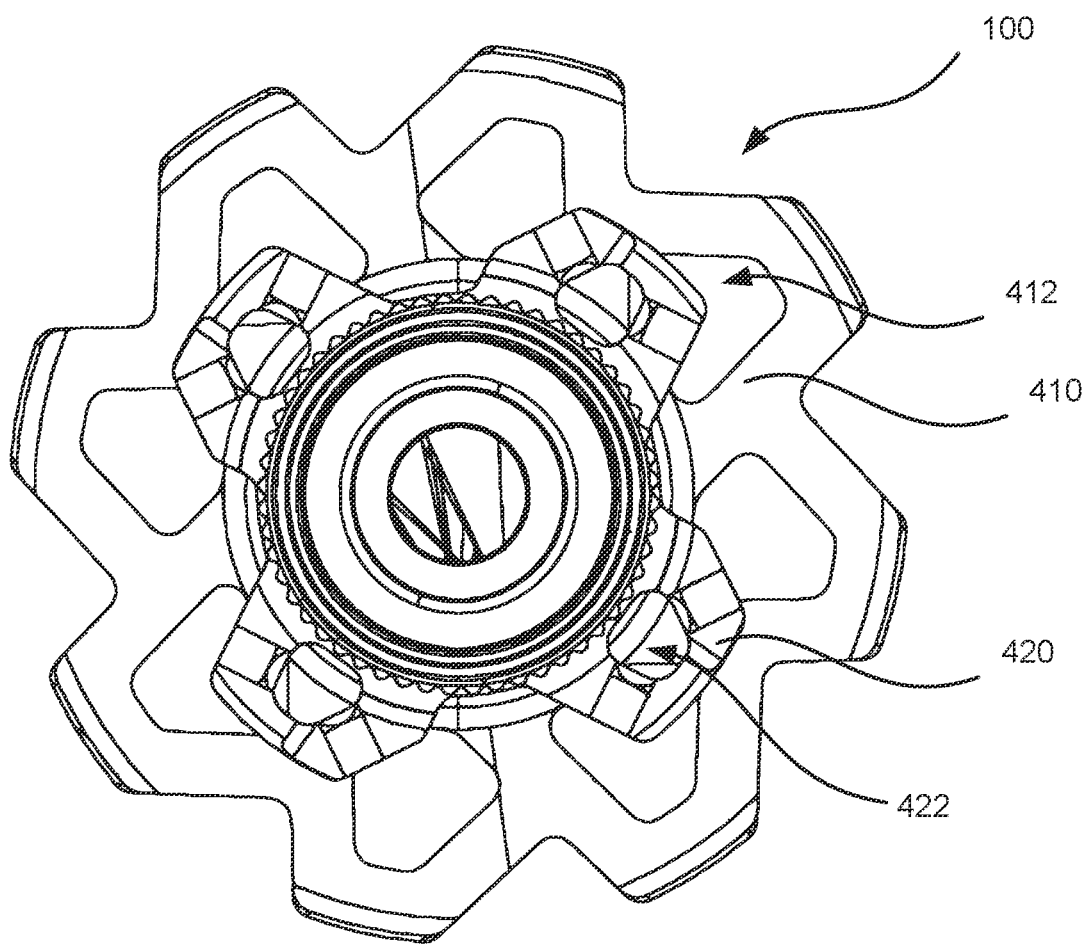
FIG. 5 is a front view of a hub, according to an embodiment of the present disclosure.

FIG. 4 is a perspective view of hub 100 of FIG. 2, according to some embodiments of the present disclosure. Consistent with FIG. 2 and FIG. 3, on the rotor side, the hub body 110 is connected to the rotor housing 132 and the rotor-side cover 136 is mounted onto one end of the hub axle 114. On the hub side, the hub-side cover 102 is mounted onto the other end of the hub axle 114. As shown in FIG. 4, hub body 110 of hub 100 includes two flanges 410 and 420, to which spokes (e.g., spokes 18 in FIG. 1) can be attached, on each side. For example, each of hub flanges 410 and 420 may be formed with multiple equiangularly displaced spoke apertures 412, 422. FIG. 5 is a front view of the hub 100 showing a design of the flanges 410 and 420, according to some embodiments of the present disclosure. Referring to FIG. 5, in some embodiments, there may be eight spoke apertures 412 in one hub flange 410, and four spoke apertures 422 in another hub flange 420, but the present disclosure is not limited thereto.

Figure 6:
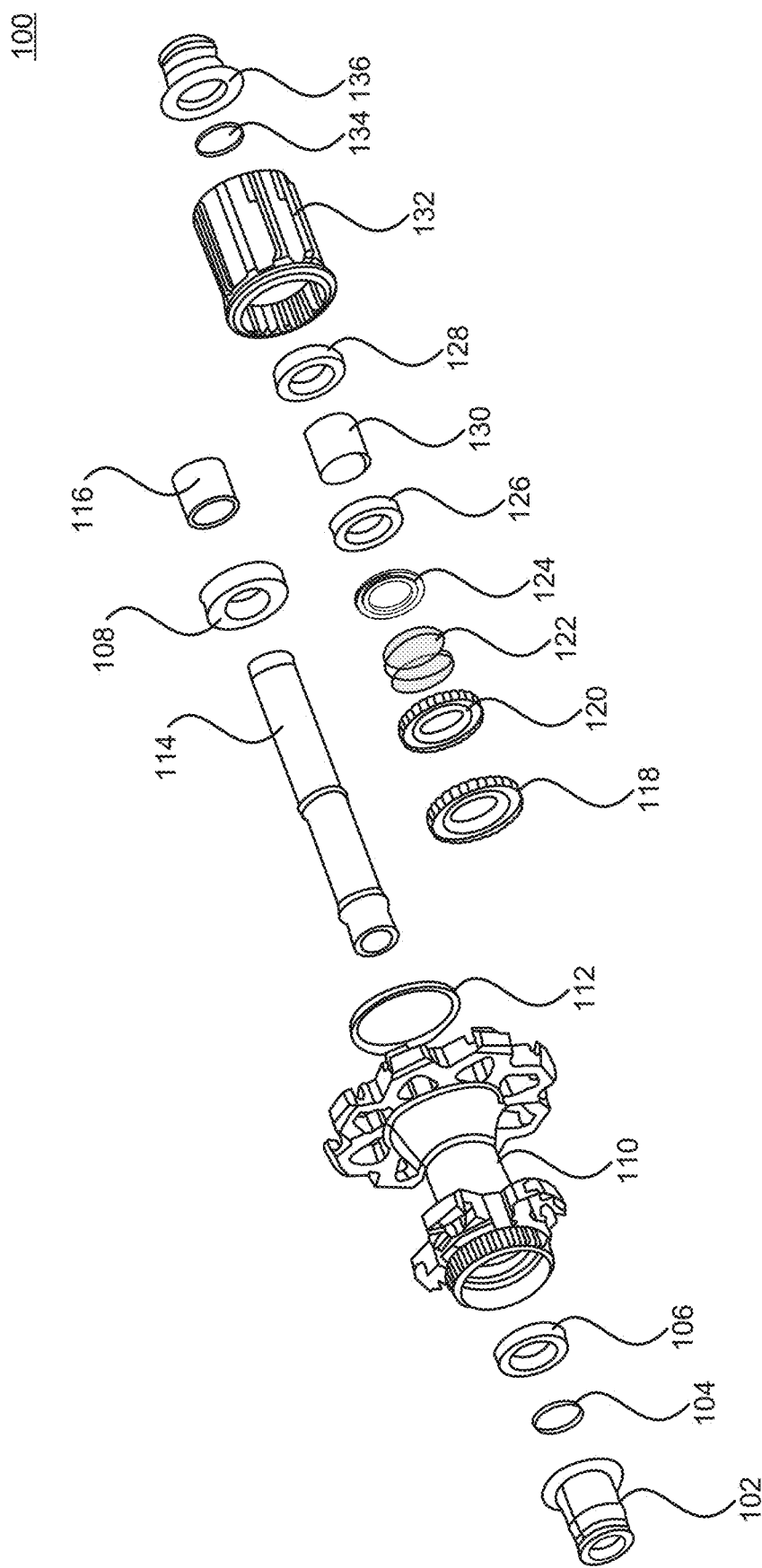
FIG. 6 is an exploded view of a hub, according to an embodiment of the present disclosure.

FIG. 6 is an exploded view of a hub 100, according to an embodiment of the present disclosure. Referring to FIG. 6, bearing units 106, 108, 126 and 128, sleeve bodies 116 and 130, toothed disc units 118 and 120, spring 122 and positioning plate 124 forming the freewheel system can be installed and mounted to hub axle 114 through the respective hollow cavities of the components and arranged within hub body 110 or rotor housing 132. It is noted that in some embodiments, spring 112 and positioning plate 124 can also be arranged between the toothed disc unit 118 and the bearing unit 108 to achieve similar functions. The arrangement illustrated in FIG. 6 is an example and not meant to limit the present disclosure.

Figure 7:
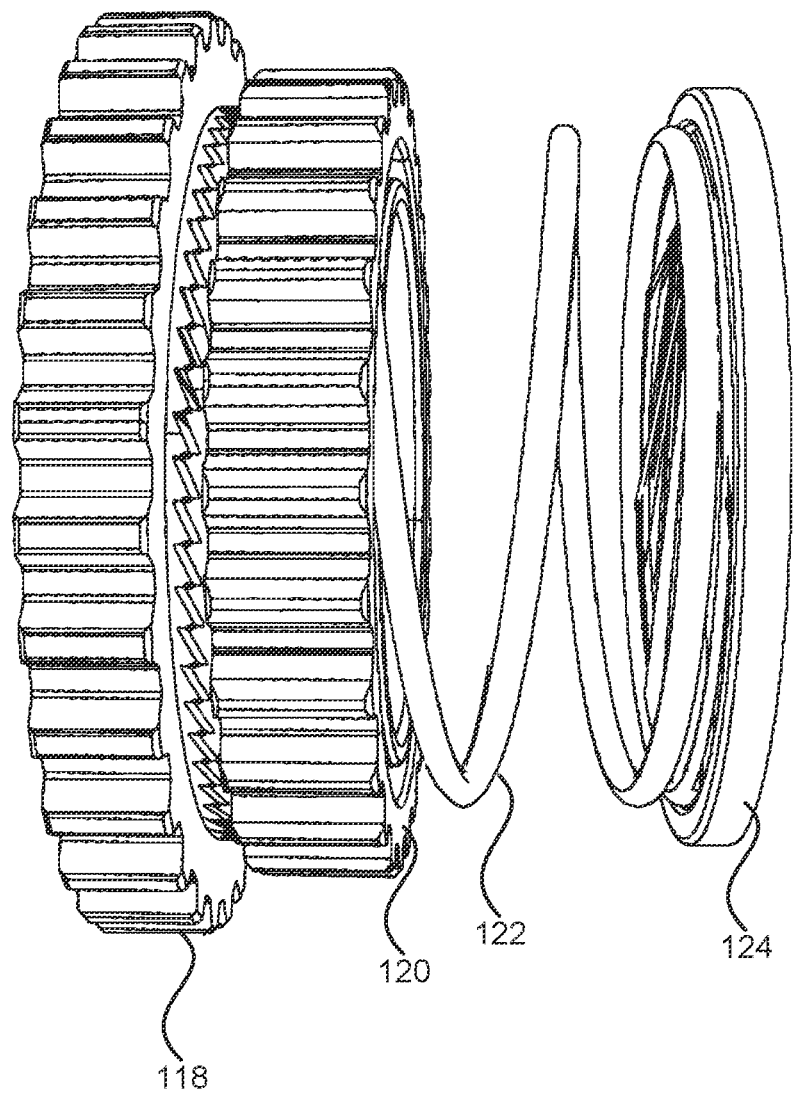
FIG. 7 illustrates a freewheel mechanism of a hub, according to an embodiment of the present disclosure.

FIG. 7 illustrates a freewheel mechanism 700 including hub-side toothed disc unit 118, rotor-side toothed disc unit 120, and spring 122, according to an embodiment of the present disclosure. As shown in FIG. 7, when the user pedals in a driving direction (e.g., the pedaling direction that drives the bicycle forward), toothed disc units 118 and 120 may be engaged with each other via axial toothings. Accordingly, the torque applied by the pedaling force is reliably transmitted between rotor-side toothed disc unit 120 and hub-side toothed disc unit 118. On the other hand, when the user stops pedaling or pedals backward in an opposite direction, toothed disc units 118 and 120 are configured to axially diverge from one another, thus providing the freewheeling function. In other words, hub-side toothed disc unit 118 is rotatable with respect to rotor-side toothed disc unit 120, which permits the wheel to rotate freely while the pedals are stationary or rotating in the opposite direction. To ensure engagement of toothed disc units 118 and 120 when a user pedals in the driving direction, toothed disc units 118 and 120 are urged toward one another by spring 122, which functions as a biasing device. In some embodiments, spring 122 may be a coil spring, such as conical coil springs or cylindrical spring, but the present disclosure is not limited thereto. The spring 122 may be a flat wire coil spring, a round wire coil spring, or a wave spring, which will be described in more details below.

Figure 8:
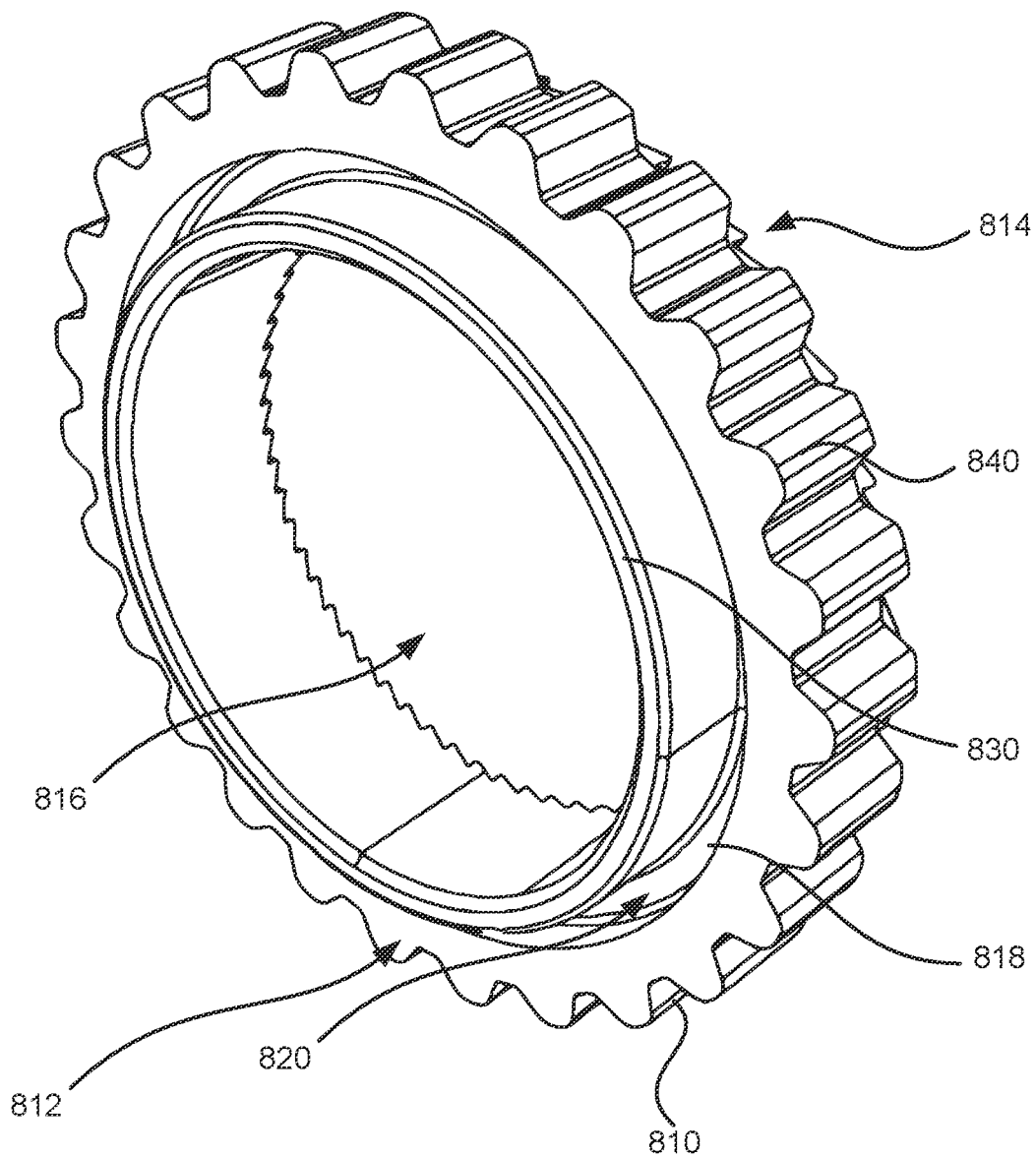
FIG. 8 is a perspective view of a rotor-side toothed disc unit, according to an embodiment of the present disclosure.

FIG. 8 is a perspective view of a rotor-side toothed disc unit 120, according to an embodiment of the present disclosure. As shown in FIG. 8, rotor-side toothed disc unit 120 includes a tubular body 810 having a first surface 812 and a second surface 814. A base 818 of tubular body 810 defines a hollow cavity 816 for mounting to hub axle 114 (not shown in FIG. 8). On first surface 812, a groove 820 extends along an axial direction of tubular body 810. As shown in FIG. 8, in some embodiments, groove 820 separates an inner ring 830 and an outer ring 840 protruding from a base 818 of tubular body 810 along an axial direction of tubular body 810. Inner ring 830 substantially surrounds hollow cavity 816 and outer ring 840 substantially surrounds inner ring 830.

In the embodiment depicted in FIG. 8, an outer contour of outer ring 840 may form a non-round shape corresponding to an inner contour of the hub component, such as the hub body or a receiving ring fixed or attached to the hub body, so that the rotor-side toothed disc unit 120 can be inserted into the hub, guaranteeing a simple axial displacement while ensuring a non-rotatable arrangement of the rotor-side toothed disc unit 120 with respect to the hub body to provide the freewheel function.

Figure 9:
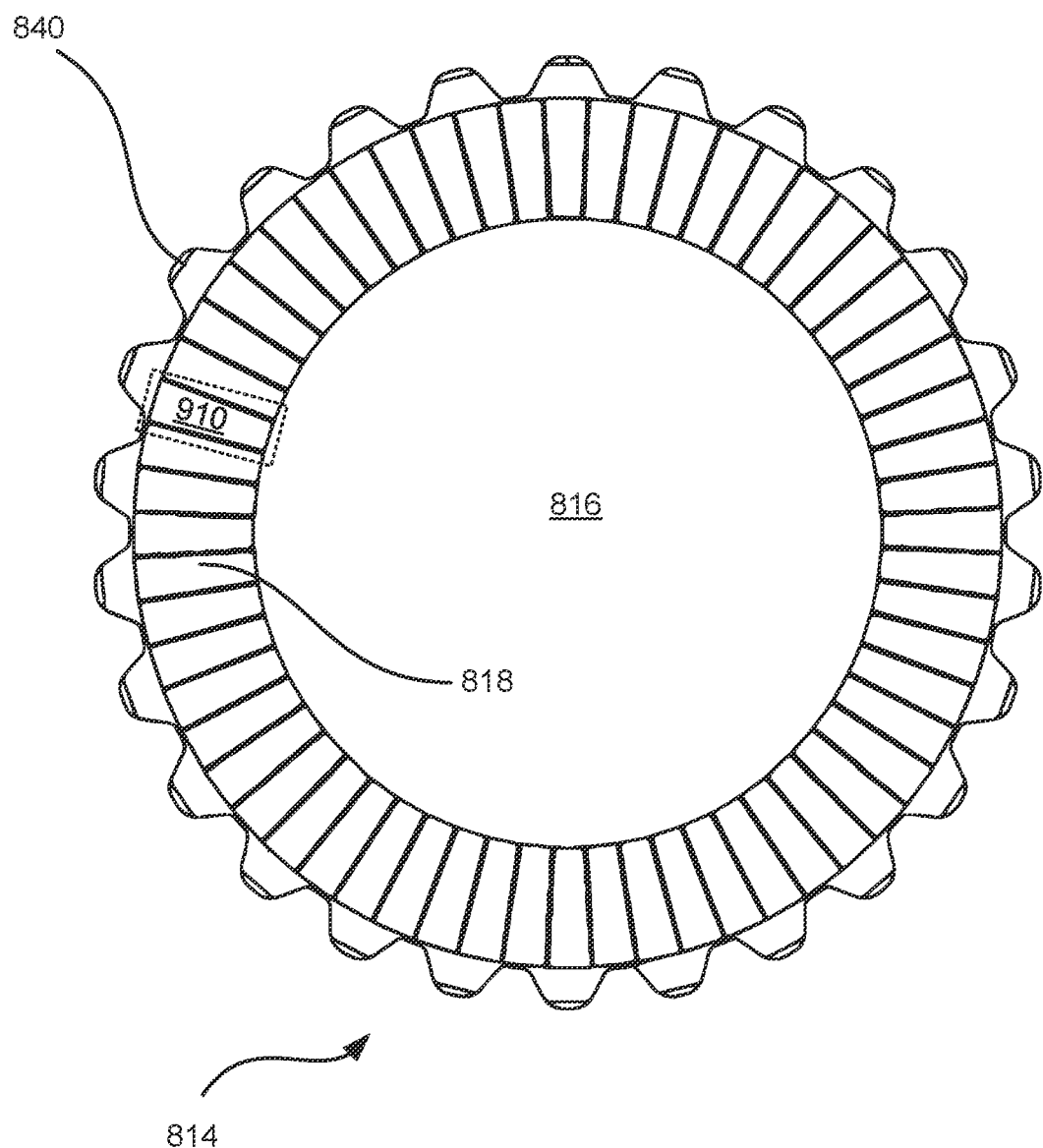
FIG. 9 is a back view of a rotor-side toothed disc unit, according to an embodiment of the present disclosure.

FIG. 9 is a back view of a rotor-side toothed disc unit 120, showing second surface 814 of rotor-side toothed disc unit 120, according to an embodiment of the present disclosure. As shown in FIG. 9, multiple axial engagement components (e.g., toothings) 910 are arranged on base 818, surrounding hollow cavity 816, at surface 814, which is the opposite surface to the surface 812 having groove 820 (not shown in FIG. 9). In various embodiments, the rotor-side toothed disc unit 120 may be a structure with 90 toothings, or a structure with 60 toothings, but the disclosure is not limited thereto. As explained above, axial engagement components 910 of rotor-side toothed disc unit 120 correspond to the axial engagement components of hub-side toothed disc unit 118, so that the toothed disc units 118 and 120 can be engaged with each other via the axial engagement components, or disengaged with each other based on the rotate direction to achieve the freewheeling function.

Figure 10:
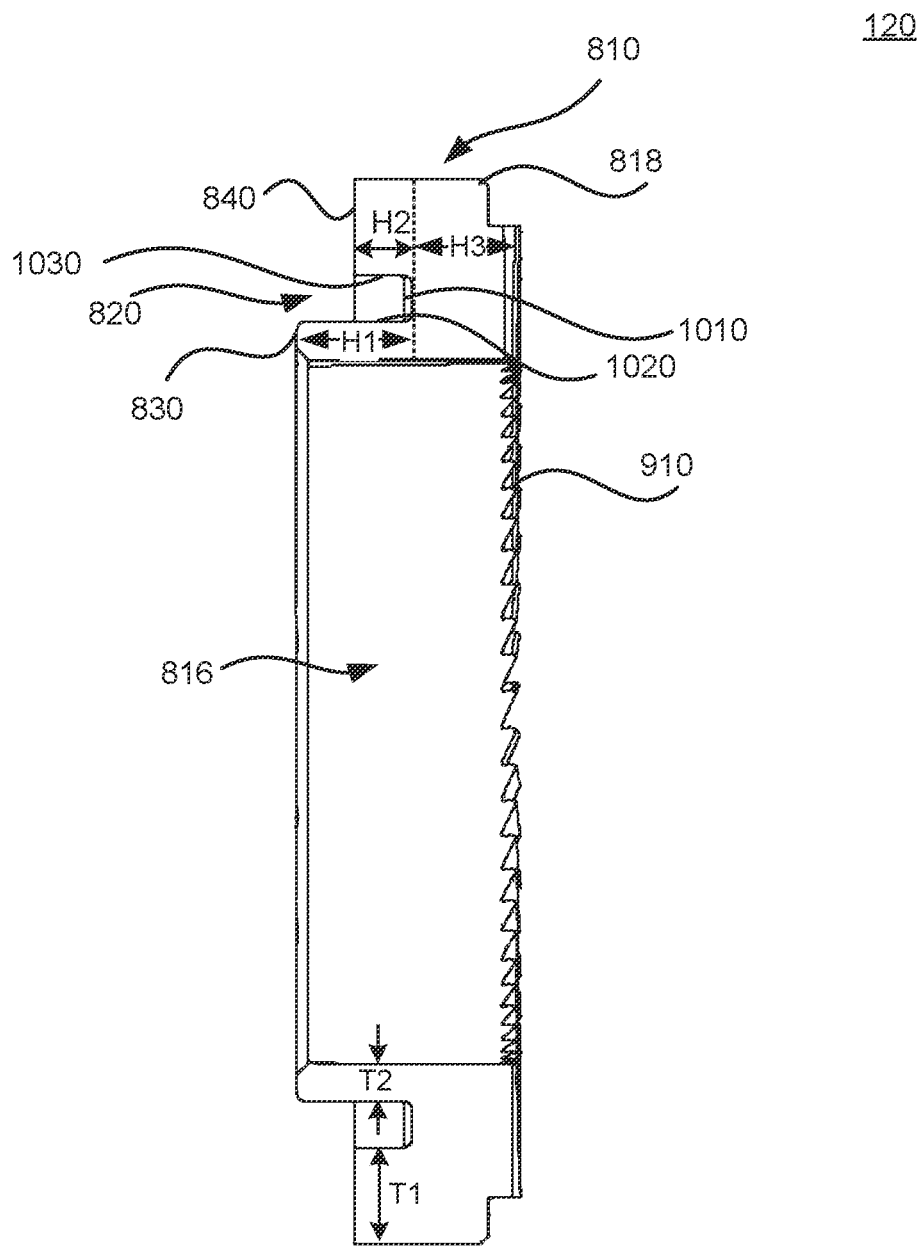
FIG. 10 is a cross-sectional view of a rotor-side toothed disc unit, according to an embodiment of the present disclosure.

FIG. 10 is a cross-sectional view of a rotor-side toothed disc unit 120, according to an embodiment of the present disclosure. As depicted in the figure, axial engagement components 910 are arranged on base 818 on one side, and inner ring 830 and outer ring 840 respectively protrude from base 818 on the other side. Accordingly, groove 820 in rotor-side toothed disc unit 120 may form a u-shaped cross section extending in a direction parallel to the axis directed toward the hub axle.

Particularly, groove 820 is defined by an inner sidewall 1020 surrounding hollow cavity 816, an outer sidewall 1030 in facing relation to and spaced from inner sidewall 1020, and a bottom surface 1010 that couples inner sidewall 1020 and outer sidewall 1030. By providing groove 820 on rotor-side toothed disc unit 120, a total weight of hub 100 can be reduced. In some embodiments, groove 820 can be formed by a mechanical etching process applied to tubular body 810. For example, during manufacturing, a milling cutter may be used to remove a portion of tubular body 810 to form inner sidewall 1020, outer sidewall 1030, and bottom surface 1010 defining groove 820. In some embodiments, a depth of groove 820 may be greater than or substantially equal to half of a height H3 of base 818 along the axial direction (e.g., the direction toward hub axle 114). By this design, when the rotor-side toothed disc unit 120 is used with a round wire coil spring arranged partially within the groove 820, the round wire coil spring can be securely located in the groove 820, which prevents the spring from malfunctioning by, for example, rolling out from the groove 820. In addition, with the groove 820 being configured to securely receive the round wire coil spring therein, the spring force can be distributed more evenly throughout the rotor-side toothed disc unit 120, thereby preventing the misalignment of the rotor-side toothed disc unit 120.

In addition, as shown in FIG. 10, a height H1 of inner ring 830 is greater than a height H2 of outer ring 840, and is substantially equal to or greater than height H3 of base 818, but the present disclosure is not limited thereto. In some other embodiments, height H1 of inner ring 830 can also be substantially equal to height H2 of outer ring 840. Alternatively stated, the height of inner sidewall 1020 may be greater than or substantially equal to the height of outer sidewall 1030. In the design shown in FIG. 10, the greater height H1 of inner ring 830 is able to provide a contact area between the inner ring 830 and the inner part of the round wire coil spring to support and align the spring properly, avoiding the misalignment of the rotor-side toothed disc unit 120 due to potential uneven spring force distribution. In addition, by reducing the height H2 of outer ring 840 and removing extra portions of the outer ring 840, the total weight of the hub structure can be further reduced. Moreover, in some embodiments, a thickness T1 of outer ring 840 may be greater than a thickness T2 of inner ring 830. Alternatively stated, outer sidewall 1030 is thicker than inner sidewall 1020. Accordingly, when the rotor-side toothed disc unit 120 is used with a flat wire coil spring that contacts the outer ring 840, a contact area between the flat wire coil spring and the rotor-side toothed disc unit 120 may be greater to provide sufficient and even spring force to the rotor-side toothed disc unit 120.

Figure 11:
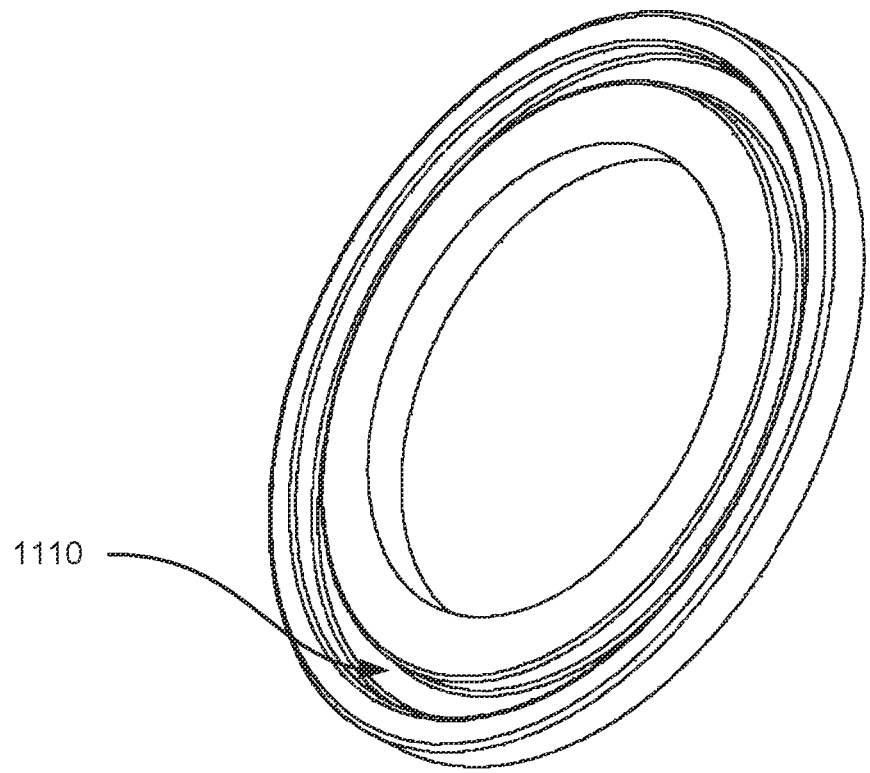
FIG. 11 is a perspective view of a positioning plate, according to an embodiment of the present disclosure.
Figure 12:
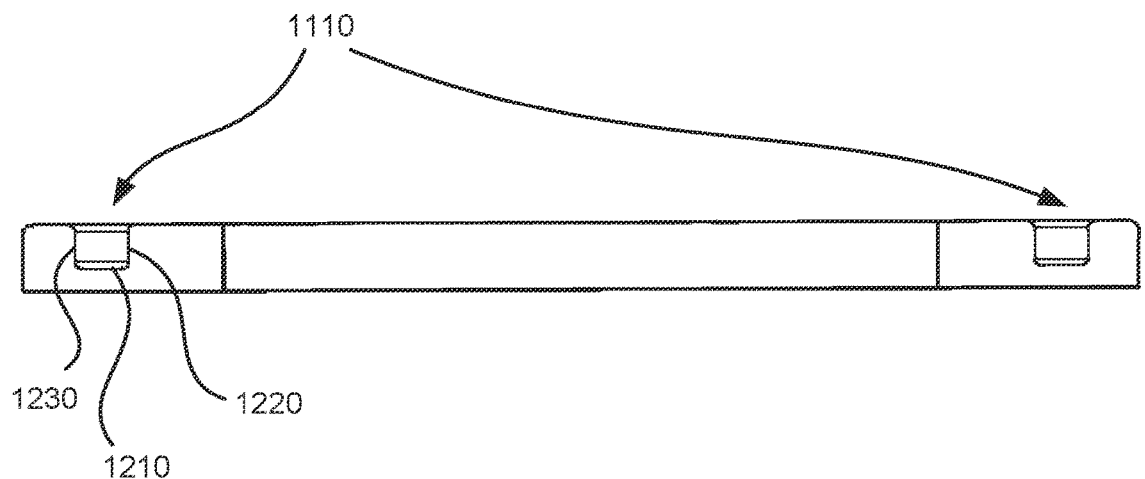
FIG. 12 is a cross-sectional view of the positioning plate shown in FIG. 11, according to an embodiment of the present disclosure.
Figure 13:
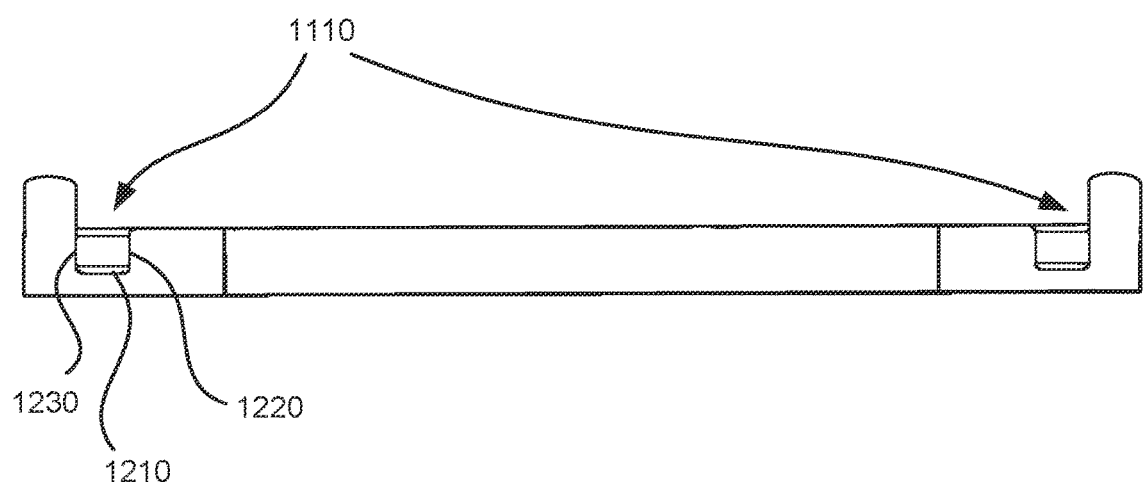
FIG. 13 is a cross-sectional view of a positioning plate, according to an embodiment of the present disclosure.

FIG. 11 is a perspective view of a positioning plate 124, according to an embodiment of the present disclosure. FIG. 12 is cross-sectional view of the positioning plate 124 shown in FIG. 11, according to an embodiment of the present disclosure. As shown in FIG. 11 and FIG. 12, in some embodiments, positioning plate 124 also defines a groove 1110 extending along the axial direction (e.g., the direction toward hub axle 114). Groove 1110 may be defined by a bottom surface 1210, an inner sidewall 1220 and an outer sidewall 1230 in facing relation to and spaced from inner sidewall 1220 by bottom surface 1210. As shown in FIG. 12, in some embodiments, a height of the inner sidewall 1220 is substantially equal to a height of the outer sidewall 1230, but the present disclosure is not limited thereto. For example, FIG. 13 is a cross-sectional view of a positioning plate 124, according to an embodiment of the present disclosure. For the positioning plate 124 of FIG. 13, a height of the outer sidewall 1230 may be greater than a height of the inner sidewall 1220. In addition, in the embodiments of FIG. 12 and FIG. 13, the inner sidewall 1220 is thicker than the outer sidewall 1230, but the present disclosure is not limited thereto. In some other embodiments, outer sidewall 1230 may be thicker than inner sidewall 1220 or outer sidewall 1230 and inner sidewall 1220 may have the same thickness.

Figure 14:
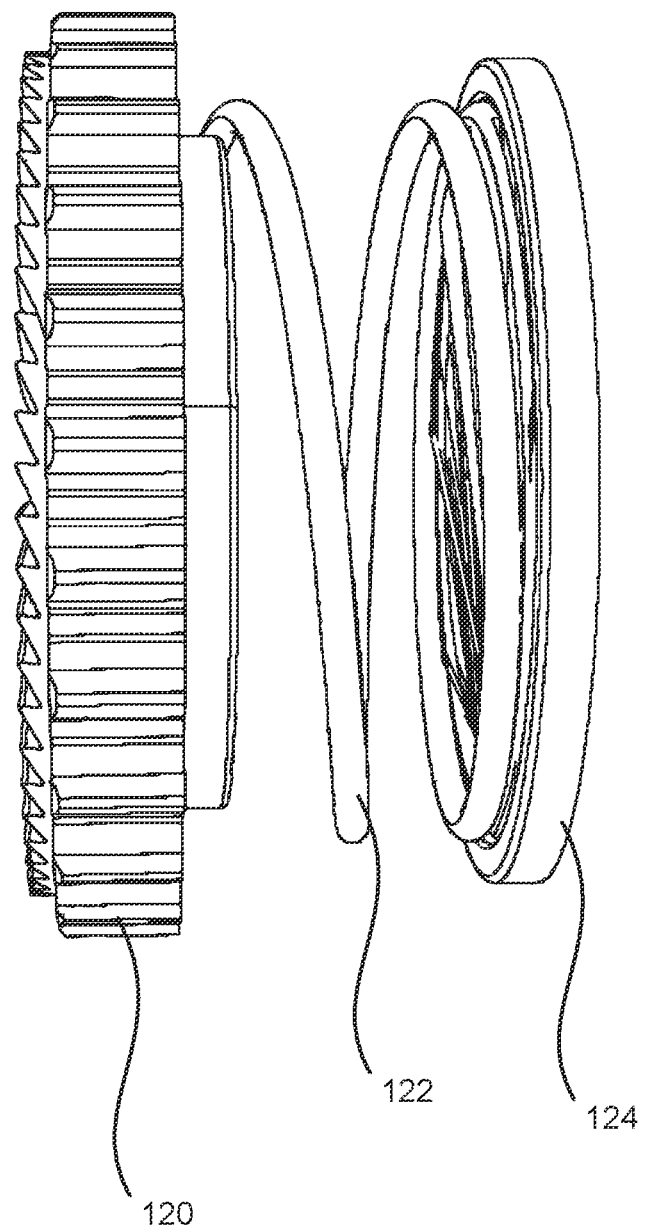
FIG. 14 illustrates a rotor-side toothed disc unit, including a spring and a positioning plate, according to an embodiment of the present disclosure.

FIG. 14 illustrates a rotor-side toothed disc unit 120, spring 122 and positioning plate 124, according to an embodiment of the present disclosure. As shown in FIG. 14, spring 122 is attached between positioning plate 124 and rotor-side toothed disc unit 120. In some embodiments, as shown in FIG. 14, spring 122 is attached to the bottom surface of the groove in rotor-side toothed disc unit 120, is partially arranged within the groove at one end, and is attached to positioning plate 124 at the other end. In other words, at least a portion of spring 122 is arranged within the groove. In some embodiments, positioning plate 124 is mounted on or arranged within bearing unit 126 and is configured to position spring 122 to prevent undesired displacement of spring 122 causing misalignment between spring 122 and bearing unit 126, which may result in damage to bicycle components or malfunction when a user is cycling.

Figure 15:
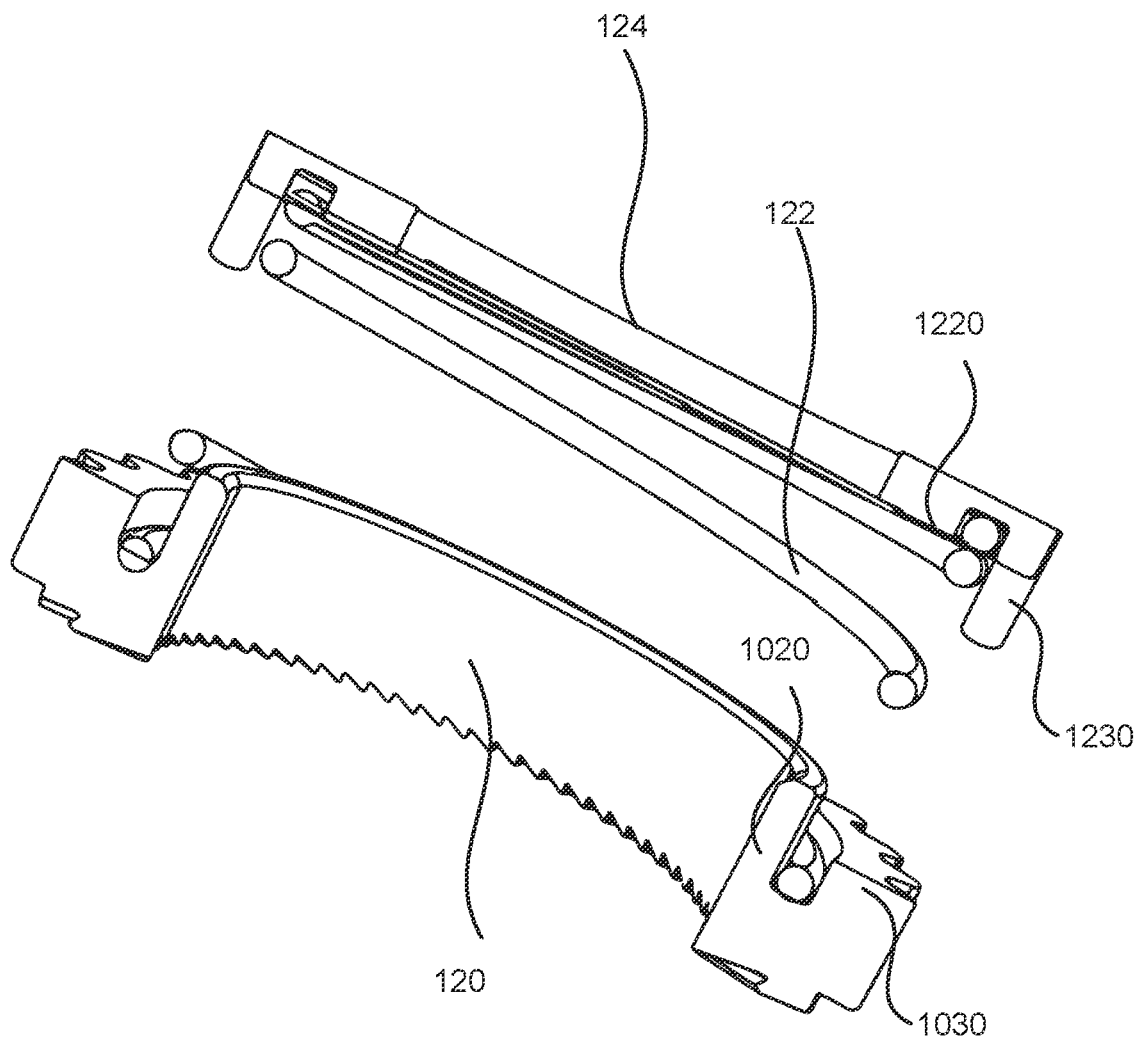
FIG. 15 is a cross-sectional view of the rotor-side toothed disc unit shown in FIG. 14, according to an embodiment of the present disclosure.

FIG. 15 is a cross-sectional view of the rotor-side toothed disc unit 120 shown in FIG. 14, according to an embodiment of the present disclosure. As shown in FIG. 15, in some embodiments, a height of inner sidewall 1020 plus a height of inner sidewall 1220 is substantially equal to a height of outer sidewall 1030 plus a height of outer sidewall 1230. Alternatively stated, when spring 122 is compressed, positioning plate 124 may be configured to abut inner ring 830 and outer ring 840 at the same time and cover spring 122 to avoid undesired shifting or misalignment of spring 122. In some other embodiments, a height of outer sidewall 1030 plus a height of outer sidewall 1230 is greater than a height of inner sidewall 1020 plus a height of inner sidewall 1220. Alternatively stated, when spring 122 is compressed, positioning plate 124 may be configured to abut only outer ring 840 while inner ring 830 and positioning plate 124 are spaced apart.

Figure 16A:
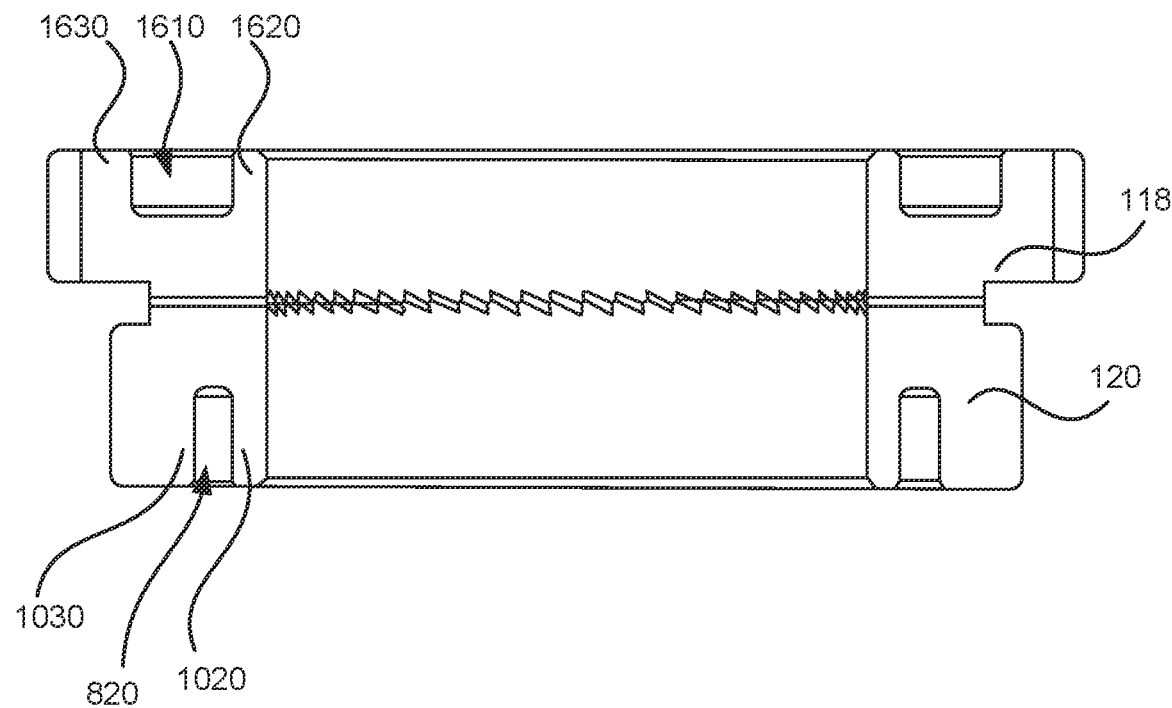
FIG. 16A illustrates a hub-side toothed disc unit and rotor-side toothed disc unit engaged to each other, according to an embodiment of the present disclosure.
Figure 16B:
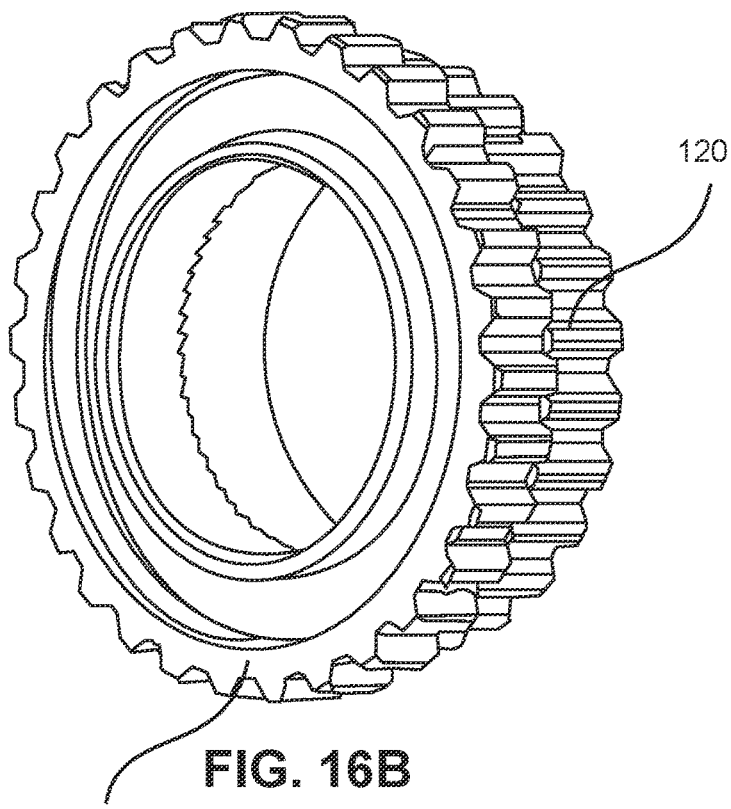
FIG. 16B and FIG. 16C are perspective views of the engaged toothed disc units shown in FIG. 16A, according to embodiments of the present disclosure.
Figure 16C:
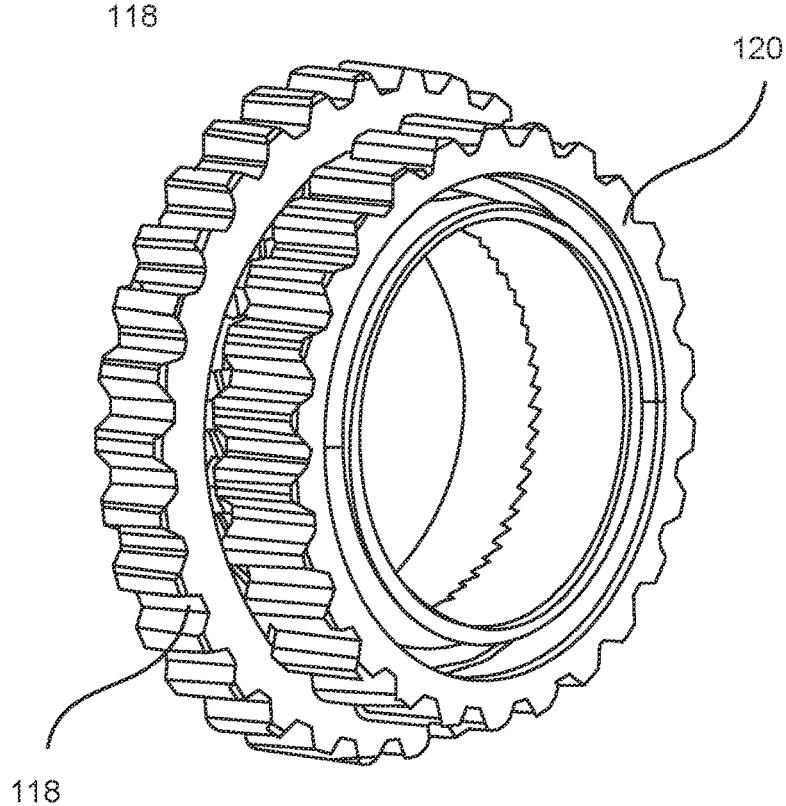

FIG. 16A illustrates a hub-side toothed disc unit 118 and rotor-side toothed disc unit 120 engaged to each other, according to an embodiment of the present disclosure. FIG. 16B and FIG. 16C are two perspective views of the engaged toothed disc units 118 and 120 shown in FIG. 16A, according to embodiments of the present disclosure. As shown in FIGS. 16A-16C, in some embodiments, a height of inner sidewall 1020 of rotor-side toothed disc unit 120 may be substantially equal to a height of outer sidewall 1030 of rotor-side toothed disc unit 120, forming a u-shaped cross section extending in a first direction parallel to the axial direction.

In addition, as depicted in FIGS. 16A-16C, hub-side toothed disc unit 118 may also include a groove 1610 with groove 1610 forming a u-shaped cross section extending in the opposite direction of the first direction. As shown in FIG. 16A, in some embodiments, a height of inner sidewall 1620 of hub-side toothed disc unit 118 may be substantially equal to a height of outer sidewall 1630 of hub-side toothed disc unit 118. In other words, a height of the inner ring of hub-side toothed disc unit 118 may be substantially equal to a height of the outer ring of hub-side toothed disc unit 118. In some embodiments, the hub-side toothed disc unit 118 and the rotor-side toothed disc unit 120 can be used interchangeably. Accordingly, the design of the rotor-side toothed disc unit 120 mentioned above can also be applied to the hub-side toothed disc unit 118.

In some embodiments, a depth or a width of groove 1610 on hub-side toothed disc unit 118 may be different from a depth or a width of groove 820 on rotor-side toothed disc unit 120. As shown in FIG. 16A, for example, groove 1610 may be shallower and wider than groove 820, but the present disclosure is not limited thereto. By providing groove 1610 on hub-side toothed disc unit 118, a total weight of hub 100 can be further reduced. Similar to groove 820, groove 1610 may be formed by a mechanical etching process applied to hub-side toothed disc unit 118.

Figure 17A:
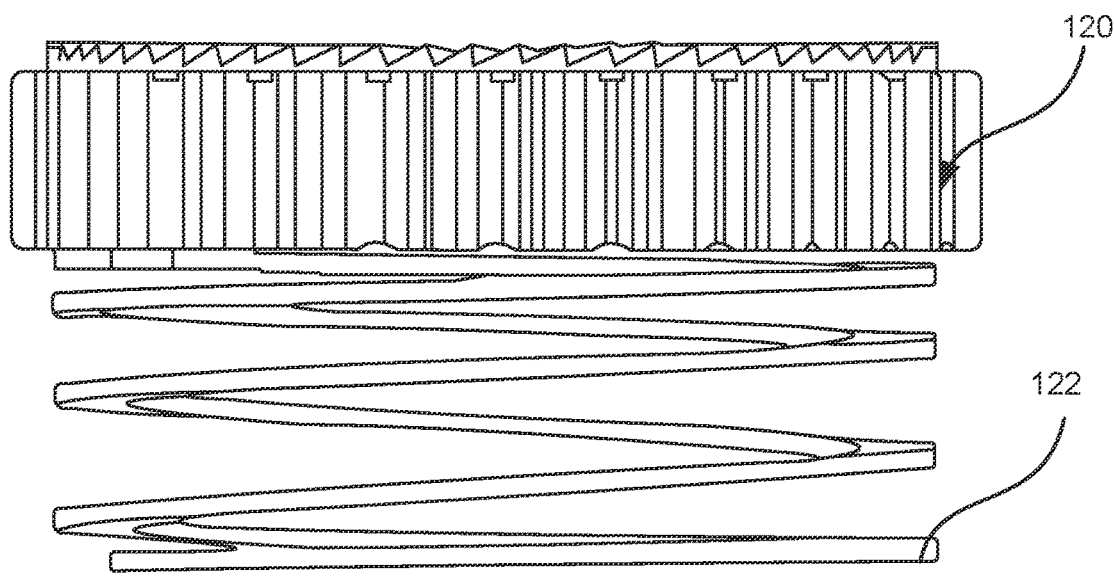
FIG. 17A and FIG. 17B illustrate a rotor-side toothed disc unit and the spring, according to embodiments of the present disclosure.
Figure 17B:
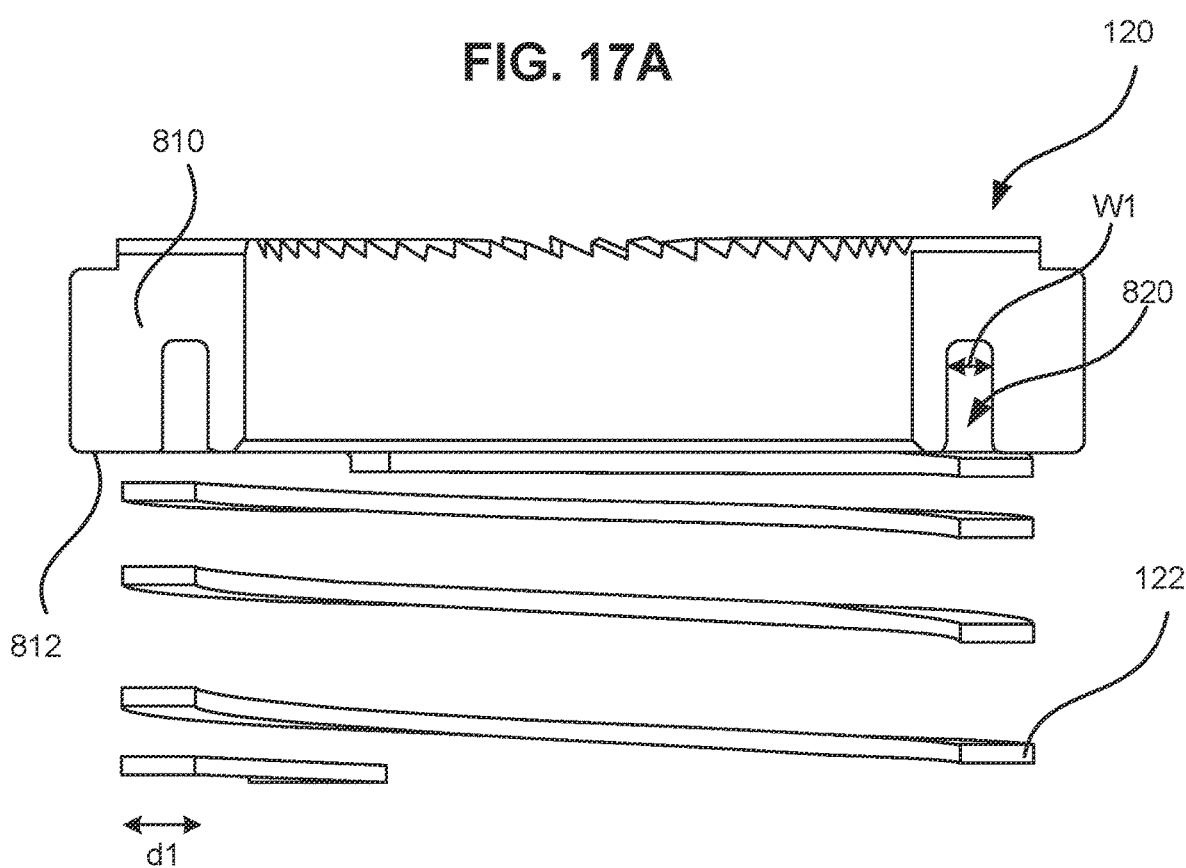

FIGS. 17A and 17B illustrate a rotor-side toothed disc unit 120 and spring 122, according to embodiments of the present disclosure. As shown in the embodiments of FIG. 17A and FIG. 17B, spring 122 may be attached to surface 812 of tubular body 810 and not arranged within groove 820. For example, in some embodiments, spring 122 may be a flat wire coil spring with a wire diameter d1 greater than a width W1 of groove 820. The flat wire coil spring depicted in FIG.

17A and FIG. 17B, for example, may be attached to an outer ring part or an inner ring part. In some embodiments, the flat wire coil spring is attached to the outer ring part with a greater thickness to increase the contact area between the rotor-side toothed disc unit 120 and spring 122, to distribute the spring force more evenly throughout the rotor-side toothed disc unit 120 and to prevent the misalignment of the rotor-side toothed disc unit 120.

Figure 18A:
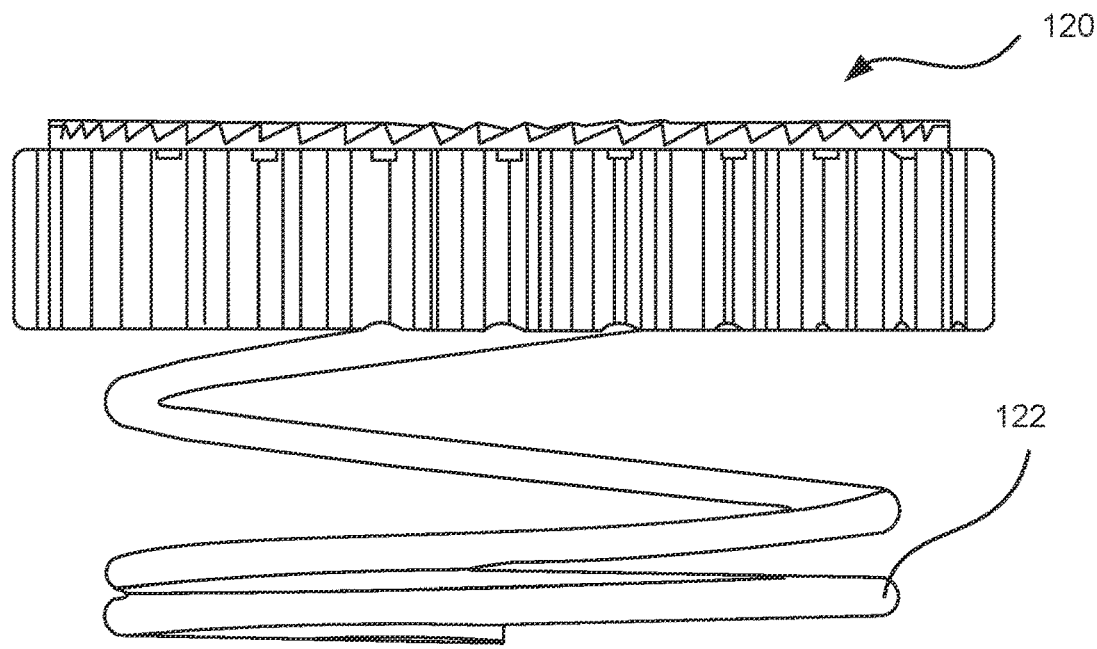
FIGS. 18A and 18B illustrate a rotor-side toothed disc unit and the spring, according to embodiments of the present disclosure.
Figure 18B:
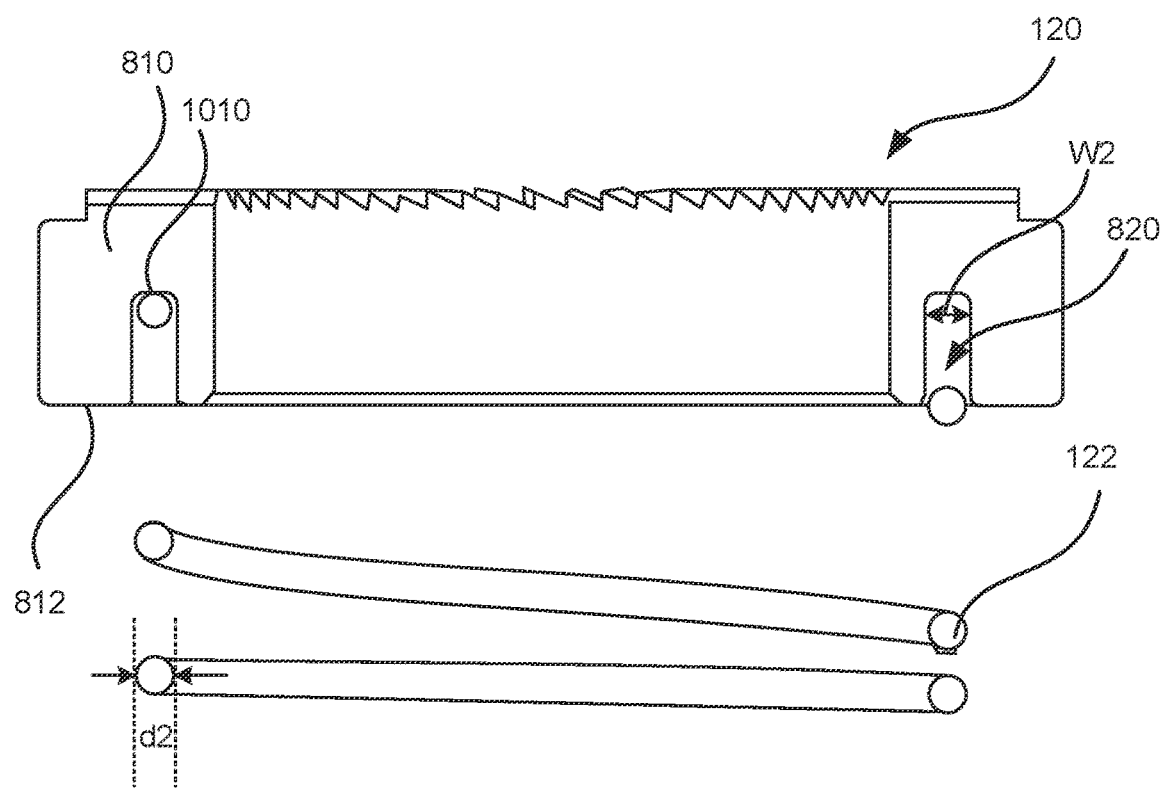

FIG. 18A and FIG. 18B illustrate a rotor-side toothed disc unit 120 and spring 122, according to embodiments of the present disclosure. As shown in the embodiments of FIG. 18A and FIG. 18B, in some embodiments, spring 122 is attached to bottom surface 1010 and at least a portion of spring 122 is within groove 820. For example, in some embodiments, spring 122 may be a round wire coil spring with a wire diameter d2 smaller than a width W2 of groove 820.

In some embodiments, the width W2 of groove 820 is specifically designed to guarantee that the round wire coil spring, having a wire diameter d2 smaller than the width W2, is applicable to provide proper spring force. Alternatively, a flat wire coil spring or a wave spring can be used in place of the round wire coil in some embodiments to provide a more suitable spring force. In some embodiments, the width W2 of groove 820 is associated with the diameter and/or the thickness of the rotor-side toothed disc unit 120. For example, the width W2 may be in a range of ¼ to ⅔ of the thickness of the rotor-side toothed disc unit 120.

Figure 19A:
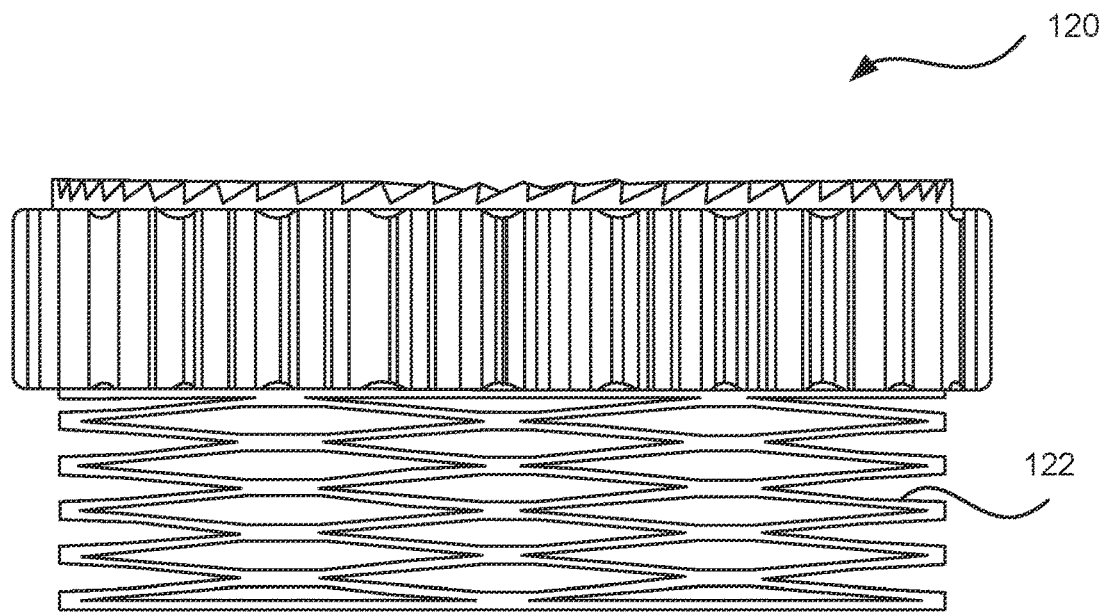
FIGS. 19A and 19B illustrate a rotor-side toothed disc unit and the spring, according to embodiments of the present disclosure.
Figure 19B:
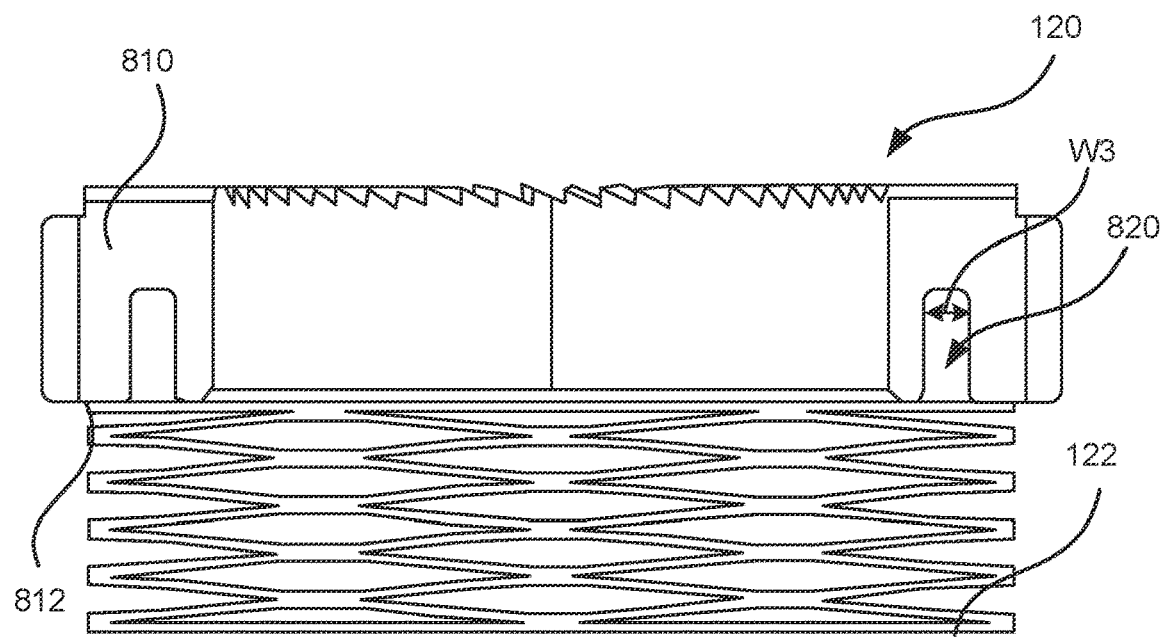

FIGS. 19A and 19B illustrate a rotor-side toothed disc unit 120 and spring 122, according to embodiments of the present disclosure. Similar to FIG. 17A and FIG. 17B, in the embodiments of FIG. 19A and FIG. 19B, spring 122 may be attached to surface 812 of tubular body 810 and not arranged within groove 820. For example, in some embodiments, spring 122 may be a wave spring with a wire diameter greater than a width W3 of groove 820. The wave spring depicted in FIG. 19A and FIG. 19B, for example, may be attached to an outer ring part or an inner ring part. In some embodiments, the wave spring is attached to the outer ring part with a greater thickness to increase the contact area between the rotor-side toothed disc unit 120 and spring 122, to distribute the spring force more evenly throughout the rotor-side toothed disc unit 120 and to prevent the misalignment of the rotor-side toothed disc unit 120.

As used herein, the term "or" encompasses all possible combinations, except where infeasible. For example, if it is stated that a device, structure, or module may include A or B, then, unless specifically stated otherwise or infeasible, the device, structure, or module may include A, or B, or A and B. As a second example, if it is stated that a device, structure, or module may include A, B, or C, then, unless specifically stated otherwise or infeasible, it may include A, or B, or C, or A and B, or A and C, or B and C, or A and B and C.

In the drawings and specification, there have been disclosed embodiments. It will be apparent to those skilled in the art that various modifications and variations can be made to the disclosed system and related methods. Other embodiments will be apparent to those skilled in the art from consideration of the specification and practice of the disclosed system and related methods.

What is claimed is:

1. A hub structure comprising:
    a tubular body defining a hollow cavity, the tubular body including a first surface and a second surface, wherein the first surface defines a first groove extending along an axial direction of the tubular body, and a plurality of axial engagement components are arranged on the second surface;
    wherein the first groove is defined by an inner sidewall surrounding the hollow cavity, an outer sidewall spaced from and configured to face the inner sidewall, and a bottom surface coupling the inner sidewall and the outer sidewall,
    wherein a height of the inner sidewall is substantially equal to a height of the outer sidewall.

2. The hub structure of claim 1, wherein a depth of the first groove is greater than or substantially equal to half of a height of a base of the tubular body along the axial direction.

3. The hub structure of claim 1, wherein a thickness of the outer sidewall is greater than a thickness of the inner sidewall.

4. A hub for a bicycle, comprising:
    a hub structure comprising:
        a tubular body defining a hollow cavity, the tubular body including a first surface and a second surface, the second surface comprising a plurality of axial engagement components, the first surface defining a first groove extending along an axial direction of the tubular body, wherein the first groove is defined by a first inner sidewall surrounding the hollow cavity, a first outer sidewall spaced from and configured to face the first inner sidewall, and a bottom surface coupling the first inner sidewall and the first outer sidewall;
    a positioning plate mounted on a hub base; and
    a spring attached between the positioning plate and the hub structure;
    wherein the positioning plate defines a second groove extending along the axial direction, the second groove being defined by a second bottom surface, a second inner sidewall, and a second outer sidewall spaced from and configured to face the second inner sidewall,
    wherein the sum of a height of the first inner sidewall plus a height of the second inner sidewall is substantially equal to the sum of a height of the first outer sidewall plus a height of the second outer sidewall.

5. The hub for a bicycle of claim 4, wherein a height of the second inner sidewall is substantially equal to a height of the second outer sidewall.

6. The hub for a bicycle of claim 4, wherein a height of the second outer sidewall is greater than a height of the second inner sidewall.

7. The hub for a bicycle of claim 4, wherein the spring is attached to the second bottom surface and partially arranged within the second groove.

8. The hub for a bicycle of claim 4, wherein the first outer sidewall is thicker than the first inner sidewall.

9. The hub for a bicycle of claim 4, wherein the spring is attached to the bottom surface and at least a portion of the spring is arranged within the first groove.

10. The hub for a bicycle of claim 4, wherein the spring is attached to the first surface of the tubular body.

11. A hub for a bicycle, comprising:
    a hub structure comprising:
        a tubular body defining a hollow cavity, the tubular body including a first surface and a second surface, the second surface comprising a plurality of axial engagement components, the first surface defining a first groove extending along an axial direction of the tubular body, wherein the first groove is defined by a first inner sidewall surrounding the hollow cavity, a first outer sidewall spaced from and configured to face the first inner sidewall, and a bottom surface coupling the first inner sidewall and the first outer sidewall;

a positioning plate mounted on a hub base; and a spring attached between the positioning plate and the hub structure;

wherein the positioning plate defines a second groove extending along the axial direction, the second groove being defined by a second bottom surface, a second inner sidewall, and a second outer sidewall spaced from and configured to face the second inner sidewall, wherein a height of the first outer sidewall plus a height of the second outer sidewall is greater than a height of the first inner sidewall plus a height of the second inner sidewall.

12. A hub for a bicycle, comprising:

a hub structure comprising:
- a tubular body defining a hollow cavity, the tubular body including a first surface and a second surface, the second surface comprising a plurality of axial engagement components, the first surface defining a first groove extending along an axial direction of the tubular body, wherein the first groove is defined by a first inner sidewall surrounding the hollow cavity, a first outer sidewall spaced from and configured to face the first inner sidewall, and a bottom surface coupling the first inner sidewall and the first outer sidewall;

a positioning plate mounted on a hub base; and a spring attached between the positioning plate and the hub structure;

wherein the positioning plate defines a second groove extending along the axial direction, the second groove being defined by a second bottom surface, a second inner sidewall, and a second outer sidewall spaced from and configured to face the second inner sidewall, wherein the second inner sidewall is thicker than the second outer sidewall.

13. A hub structure, comprising:
- a base, wherein a plurality of axial engagement components are arranged on the base;
- an inner ring protruding from the base along an axial direction and substantially surrounding a hollow cavity of the hub structure; and
- an outer ring protruding from the base along the axial direction and substantially surrounding the inner ring, wherein a height of the inner ring is substantially equal to or greater than a height of the outer ring;
- wherein a thickness of the outer ring is greater than a thickness of the inner ring.

14. The hub structure of claim 13, wherein a height of the inner ring is substantially equal to or greater than a height of the base.

15. The hub structure of claim 13, wherein the plurality of axial engagement components are arranged on the base on one side, and the inner ring and the outer ring respectively protrude from the base on the other side.

* * * * *